Jan. 9, 1945. G. ANTOS 2,366,993
MACHINE FOR THE MANUFACTURE OF CAMS
Filed July 24, 1943 4 Sheets-Sheet 2
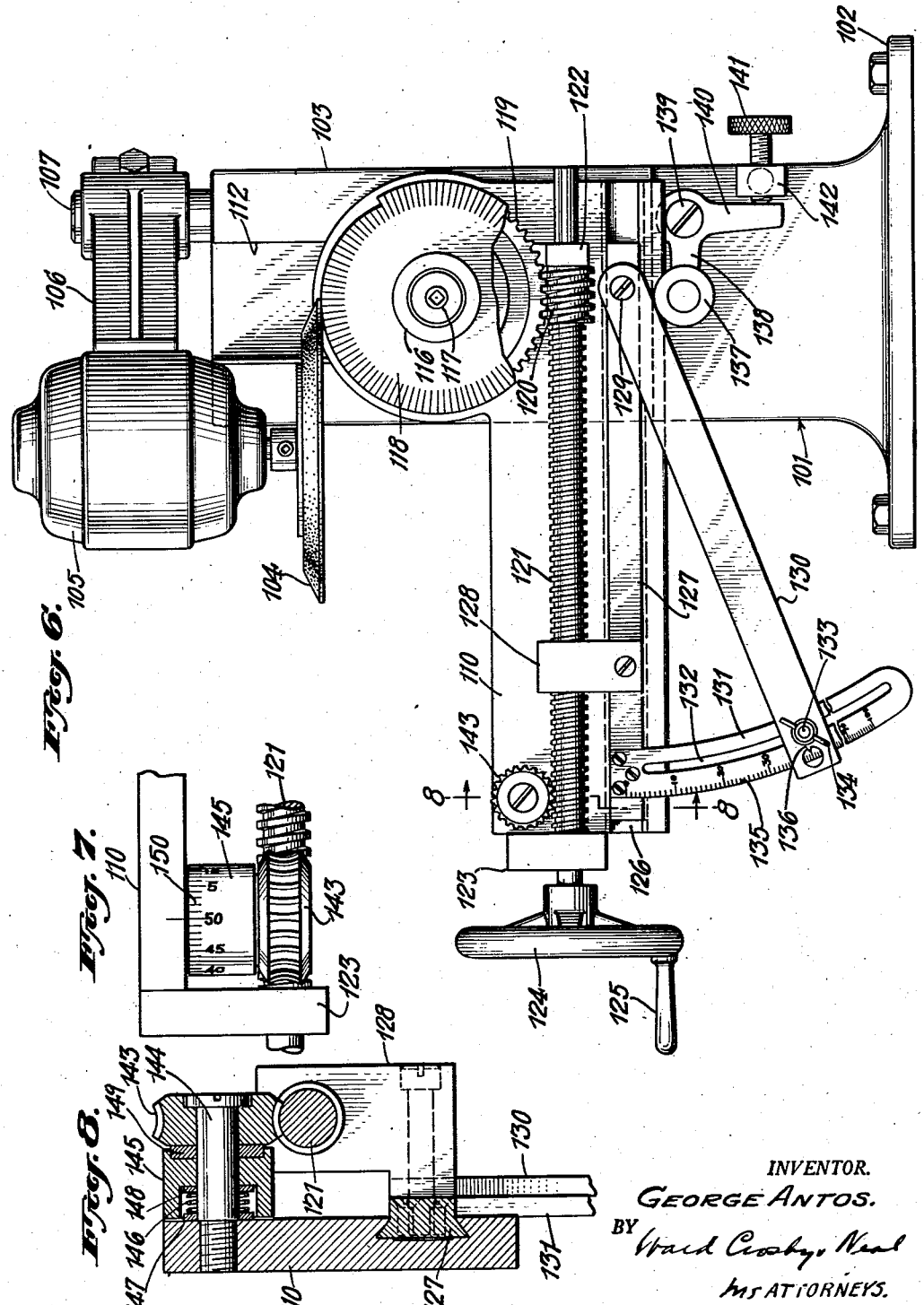
INVENTOR.
GEORGE ANTOS.
BY Ward Crosby Neal
his ATTORNEYS.

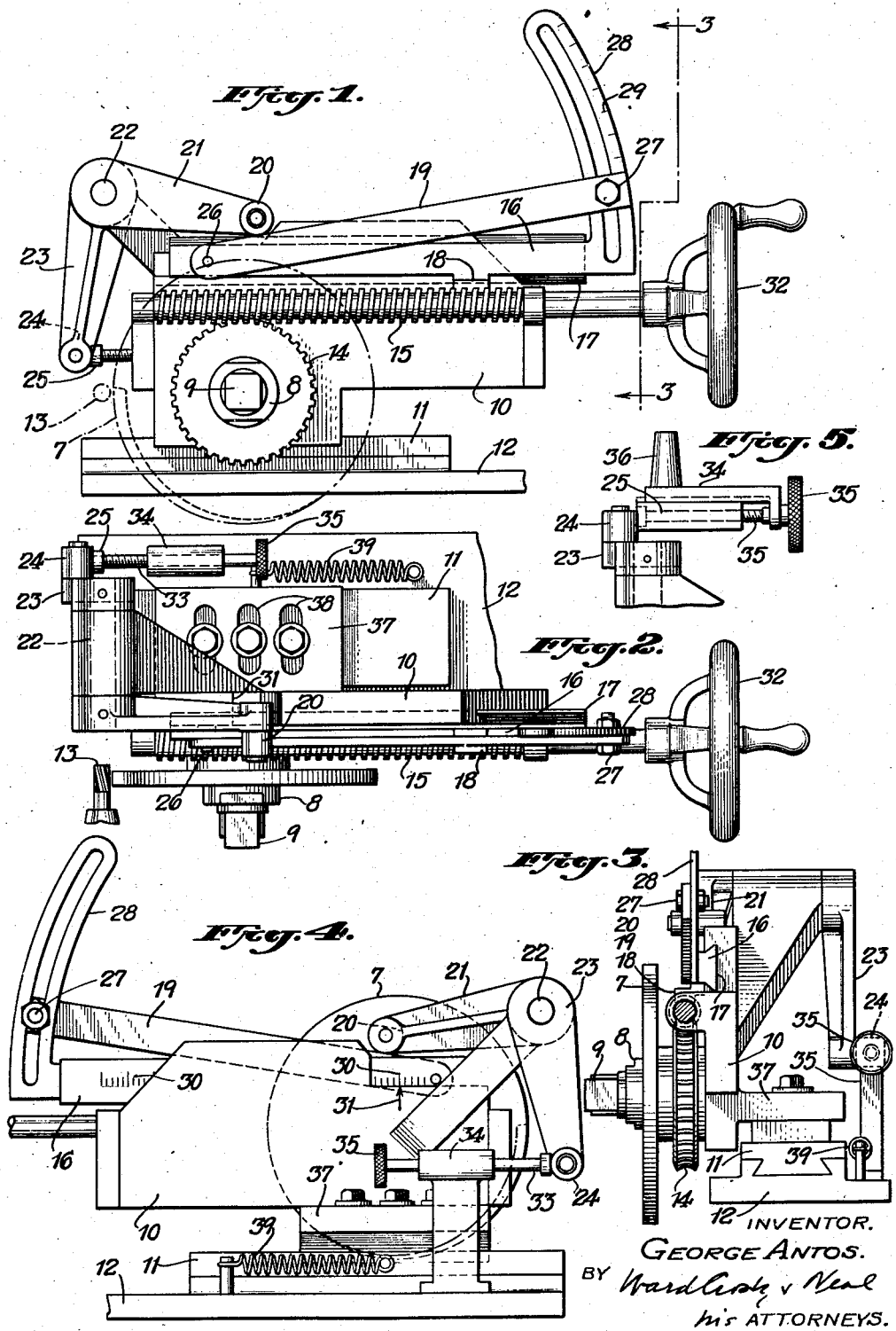

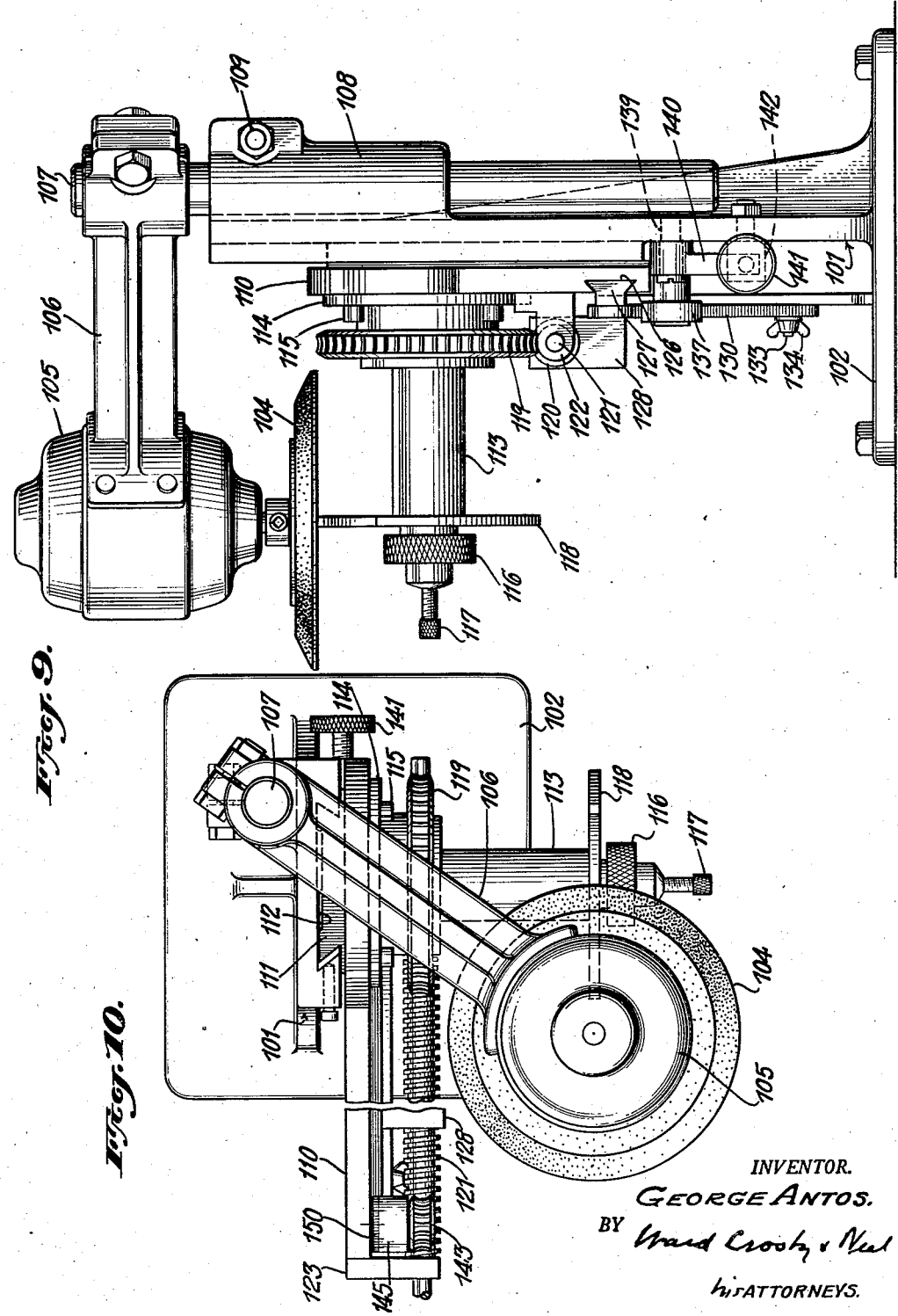

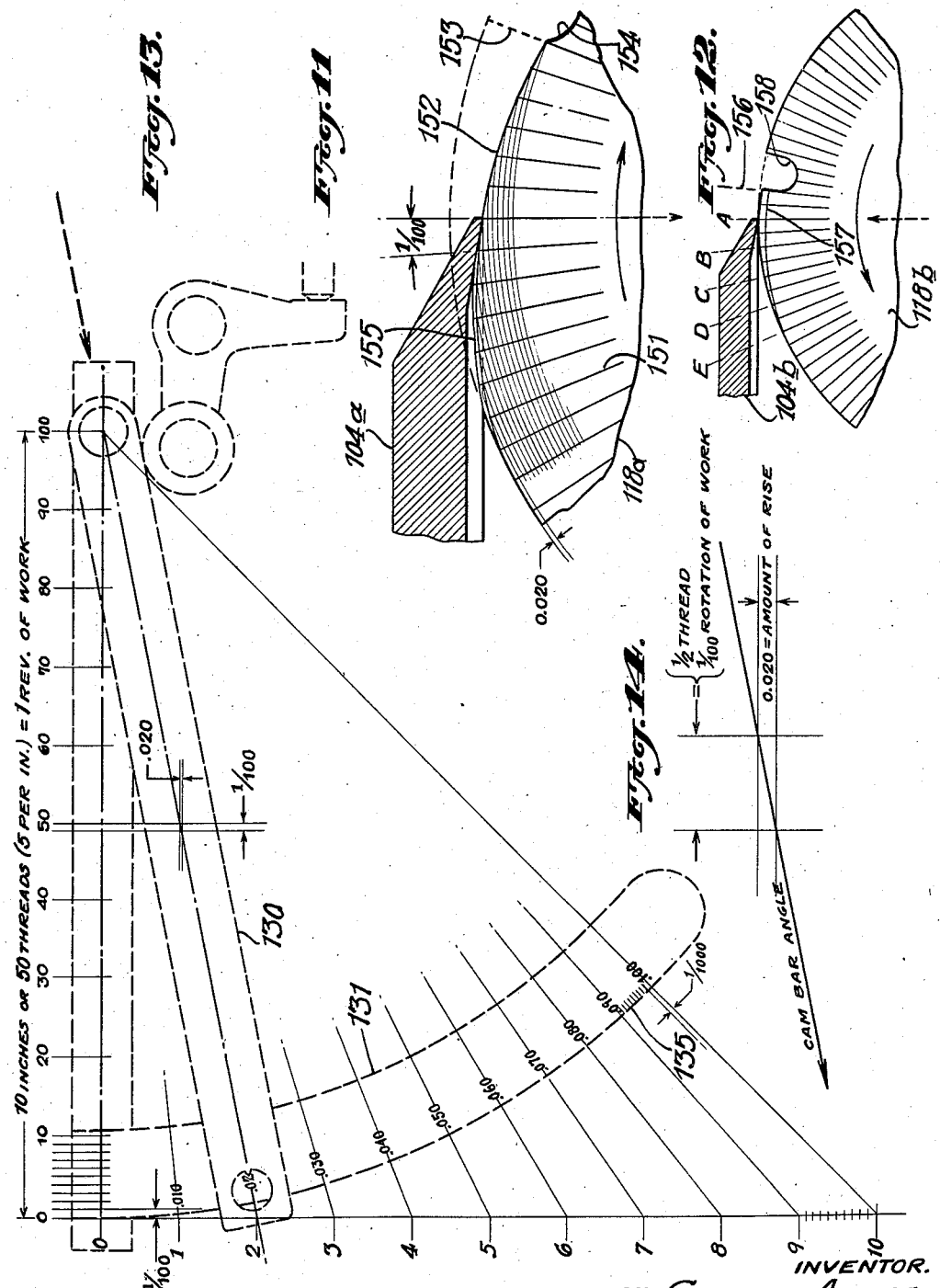

Patented Jan. 9, 1945

2,366,993

UNITED STATES PATENT OFFICE 2,366,993

MACHINE FOR THE MANUFACTURE OF CAMS

George Antos, Forest Hills, N. Y., assignor to Precision Shapes, Inc., New York, N. Y., a corporation of New York Application July 24, 1943, Serial No. 496,023

20 Claims. (Cl. 90—13.9)

This invention relates to machines for the manufacture of cams, particularly cams such as are used on automatic screw machines.

The present invention is a continuation in part of my copending application Serial No. 447,214, filed June 16, 1942, for "Lathe attachment for machining cams for automatic screw machines."

An object of the invention is to provide simple and practical mechanism for outlining or forming cams of various shapes.

Another object is to provide such mechanism which can be readily set to produce cams of different configurations.

Another object is to provide such mechanism which may be adapted to and operated as an attachment for a lathe or other machine.

The invention consists in the novel features, arrangements and combinations of parts embodied by way of example in the devices hereinafter described as illustrating preferred forms of the invention, and the invention will be more particularly pointed out in the appended claims.

Further objects, features and advantages of the invention will more fully appear from the following specification and claims taken in connection with the accompanying drawings, in which:

Fig. 1 is a side elevation illustrating the principal features of one embodiment of the invention.

Fig. 2 is a partial plan view, illustrating further details of said embodiment.

Fig. 3 is a partial end view and cross section as on substantially the plane of line 3—3 of Fig. 1.

Fig. 4 is a partial side elevation illustrating the opposite side of the machine from that shown in Fig. 1.

Fig. 5 is a detail view illustrating a modified form of adjustable abutment for mounting in the tail stock of a lathe.

Fig. 6 is a side elevational view of another embodiment of the invention.

Fig. 7 is a plan view of a detail of Fig. 6.

Fig. 8 is a cross-sectional view taken at 8—8 of Fig. 6.

Fig. 9 is an end elevation of the device shown in Fig. 6.

Fig. 10 is a plan view of the device shown in Figs. 6 and 9.

Figs. 11, 12, 13 and 14 are partially diagrammatic views illustrating certain features of the invention embodied in Figs. 6–10 inclusive.

Referring to Figs. 1–5, in the particular embodiment of the invention illustrated, the cam blank, such as that indicated at 7, is clamped at 8, on a rotary spindle 9, journalled transversely on the carriage 10, slidably mounted at 11, on a suitable base 12.

The shaft or spindle 9, is turned to rotate the blank in respect to the cutter or cam-outlining tool 13, by means of a worm gear 14, fixed on said shaft and engaged by the feed screw 15, journalled on the side of the carriage above said worm gear.

The carriage 10 is advanced with respect to the tool by special means adjustable to predetermine the cam curvature and shown as comprising a slide 16, mounted on the side of the carriage at 17, above the feed screw, having a gear or nut segment 18, engaging the feed screw and carrying an inclined track or cam rail 19. In the present embodiment, the mechanism cooperating with the incline 19 for effecting advance of the carriage 10 comprises a roller 20 which engages the incline 19 for relative movement longitudinally thereof. The roller 20 is carried on the end of an arm 21, fixed on one end of a rock shaft 22, carrying at its opposite end an arm 23, with a roller 24, engaging a fixed abutment 25 mounted on the base 12. It will therefore be seen that as the slide 16 is advanced, the roller 20 moves up the incline 19 and this vertical movement is translated to a horizontal movement by means of the arm 21, rock shaft 22 and arm 23 whose outer end is anchored on the fixed abutment 25 serving as a fixed fulcrum point or point of reaction causing the carriage 10 to be moved forward. This forward movement of the carriage 10 feeds the blank 7 laterally toward the tool 13.

The ratio of advance of the carriage with respect to rotative movement of the cam blank carrier is determined by the angle of inclination of the cam track 19. The latter is shown as pivotally mounted at its lower forward end at 26, on the carrier slide 16, and as having its outer upper end adjustably clamped at 27, on a slotted segment 28, rising from the outer end of the slide. This segment is shown as carrying a scale 29, laid off in figures representing depth of cut in relation to angular advance of the cam blank, or otherwise, to assist in setting the track to accomplish the desired ratio of advance of the carriage in respect to rotation of the blank.

Further, to assist in setting the parts for the desired cam configuration, means is provided for determining the rotative position of the blank 7. For example, the slide 16 may carry a longitudinal scale 30, cooperable with an index 31, on the carriage, and since the movement of the carriage 10 is synchronous with the rotation of the blank 7, the scale 30 and index 31 will indicate the angular or rotative position of the blank 7.

The feed screw is shown as operable by a hand wheel 32.

The relatively fixed abutment 25, against which the rocker arm 23 pushes to advance the carriage is shown as adjustable by being carried by a screw 33 mounted in a post 34, fixed on the base, said screw having a finger wheel 35 for turning the same.

The machine may be built as a complete unit or be designed as an attachment to be mounted and used on other machines, for example, on a lathe. In the latter case, the cutter could be mounted in the head of the lathe and the abutment member be mounted in the tail stock, as by making the supporting member 34 for the screw 33 with a tapered projection to fit in the socket for the lathe center, as indicated at 36 in Fig. 5. The slide carriage 10 is shown as having an angularly offset base portion 37, slotted at 38, Fig. 2, for bolts which may be used for securing it down on the cross feed carriage of a lathe. When so used, the cross feed screw of the lathe carriage could be removed or disconnected, so as not to interfere with the progressive cross feed here illustrated.

To keep the angularly related arms 21 and 23 of the rocker effectively related to the inclined cam track 19, and the fixed abutment 25, the sliding carriage 10, may be tensioned outwardly as by spring 39, shown in Figs. 2, 3 and 4, as connected between the carriage slide 11, and the relatively stationary supporting base structure 12.

For purposes of facilitating an understanding of the manner in which the mechanism operates, an example of setting and operating the machine to cut a given cam contour will be described following. For purposes of this description, it is noted that the scale 30 is preferably divided into ten main parts each comprising ten sub-divisions; each sub-division representing 1/100 part of the angular or rotational movement of the cam blank 7 about its axis of rotation. Similarly the quadrant scale 29 is divided into one hundred parts each representing 1/100 inch depth of cut radially of the cam blank 7 (i. e., corresponding to the cam "rise") for each 1/100 part of rotational or angular movement of the cam blank 7 about its axis of rotation.

OPERATION (*Figs. 1–5*)

Assuming that it is desired to cut the cam curve for ¼ of the cam circumference (25/100) and that a total depth of cut or cam rise of ½ inch (.50 inch) is desired: The incline 19 therefore is set at the second main division reading 2 and representing .02 inch as the increment of cut in a radial direction per 1/100 of angular movement of the cam blank (i. e., .50 inch divided by 25 equals .02 inch) If desired, to facilitate timing, these cam blanks are divided into 100 equal angular parts and the cam curve may be positioned on the exact portion of the periphery of the blank desired. In the present example, we will assume that it is desired to have the cam curve extend, say, from the fifth angular divisional mark to the thirtieth angular divisional mark, so that the cam curve will extend 25/100 of the angular rotational movement. The hand wheel 32 is rotated until the fifth mark on the scale 30 comes opposite the index pointer 31, the screw 33 being backed away to permit this setting. Then by adjusting the screw 33, by means of the knurled head 35, the roller 20 will be brought against the incline 19 and thereafter the carriage 10 will be moved forward until the periphery of the cam blank 7 is moved into engagement with the cutting tool 13. This completes the setting of the machine for the example given.

The tool 13 is then rotated and the blank 7 is fed angularly and laterally as follows: The operator rotates the wheel 32 which rotates the worm screw 15, thereby driving the worm wheel 14, the spindle 9 and the blank 7 carried thereon to effect rotary feed of the blank 7. This causes a simultaneous and synchronous lateral movement of the blank 7 which is fed in the following manner. As the worm 15 rotates, it causes the worm block or screw 18 to move axially of the worm, carrying with it the slide 16 and attached incline 19. As the incline 19 moves forward, it imparts vertical movement to the roller 20 and this vertical movement raises the arm 21, which through means of the rock shaft 22, moves the attached arm 23 in an anti-clockwise direction against the fixed abutment or reaction point 25. Since the rock shaft 22 is journalled in a portion fixed to the carriage 10, the carriage 10 is thereby fed to the left moving the cam blank 7 in a lateral direction toward the tool 13. The operator continues to rotate the wheel 32 until the index pointer 31 (Fig. 4) reaches the reading 30 on the scale 30 whereupon the blank will have been rotated through 25/100 of its complete rotational movement and the total depth of cut, as predetermined by the setting of the incline 19, will have reached ½ inch.

*Embodiment of Figs. 6–10 inclusive*

This embodiment comprises basic features in common with the embodiment heretofore described and is essentially a modification of said previously described embodiment.

Referring more particularly to Figs. 6, 9 and 10; this embodiment is mounted on a standard 101 comprising a base 102 and pedestal 103. The cutting or grinding tool in the present embodiment is shown as a cutting disk or grinding wheel 104 which is carried directly on the drive shaft of an electric motor 105 secured on a suitable bracket arm 106 which is rigidly clamped on a vertical post 107 (Fig. 9) disposed in a split sleeve 108 formed integrally with the pedestal 103 and provided with a clamp screw 109 for holding the post 107 in the desired vertical and angular position. A work carriage 110 is mounted on the pedestal 103 for vertical movement with respect thereto by means of a dovetail portion 111 (Fig. 10), rigidly attached to the carriage 110 and positioned in a cooperating guideway 112 provided in the pedestal 103. The carriage 110 carries rotatably secured thereto (Figs. 9 and 10) a post or cam blank holder 113 whose inner end is suitably rotatably supported in a journal member 114 which is rigidly secured to the carriage 110 by suitable means such as screws 115. The holder 113 is provided on its outer end with suitable means, such as knurled nut 116 and screw 117, for securely clamping the cam blank 118 thereon. The holder 113 carries rigidly secured thereto a worm wheel 119 which is in driven engagement with the worm screw 120 which is rotatably fixed on a screw shaft 121 (Figs. 6 and 10) whose respectively opposite ends are rotatably journaled in and held against axial movement by the bearing blocks 122 and 123 rigidly secured to the carriage 110. The outer end of the screw shaft 121 carries fixed thereto a hand wheel 124 which is preferably provided with the crank handle 125. It will, therefore, be seen that upon rotation of the shaft 121, rotary motion or angular movement is imparted to the cam blank 118 with respect to the cutting or forming tool 104.

The carriage 110 is provided with a horizontally disposed guideway 126 in which is slidably disposed a carrier 127 which carries rigidly secured thereto a screw block 128 which is in driven engagement with the screw shaft 121. The carrier 127 carries pivotally secured thereto, as at 129, one end of a cam track or inclined rail 130, the other end of which is in adjustable engagement with the quadrant arm 131 whose upper end is rigidly secured to the carrier 127. The quadrant 131 is provided with a slot 132 through which extends a screw 133 which passes through the rail 130 and is provided with a wing nut 134 by means of which the rail may be clamped in adjusted position on the quadrant 131. The quadrant is preferably provided with a scale 135 which in the present embodiment is divided into ten main divisions each of which is sub-divided into ten divisions so as to provide one hundred sub-divisions; and the rail 130 is provided with an index pointer 136 cooperatively disposed with respect to the scale 135 for indicating the setting of the rail 130. From the foregoing it will be seen that as the screw 121 is rotated, the carrier 127 and the rail or cam track 130 are moved in a horizontal direction longitudinally of the carriage 110 simultaneously and synchronously with the rotation of the cam blank 118.

The cam track or rail 130 is provided with a follower or engaging member, which in the present embodiment is in the form of a roller 137 rotatably carried on one end 138 of a crank arm pivotally supported on the pedestal 103 by means of a screw 139. The other end 140 of the said crank is positioned for engagement with the co-operating end of an adjustable screw 141 in threaded engagement with a post 142 rigidly secured to the pedestal 103. Accordingly, when the follower or engaging roller 137 is in adjusted position against the inclined rail 130, upon longitudinal movement of the rail 130 with respect to the carriage 110, the rail 130 is thereby moved in a vertical direction with respect to the roller 137, thereby imparting vertical motion to the carriage 110 and cam blank 118. From this it will be appreciated that rotation of the hand wheel 124 serves to simultaneously and synchronously rotate for movement in an angular direction and feed in a lateral direction the cam blank 118 with respect to the cutting or forming tool 104; and the ratio of lateral feed to angular motion is determined by the angle of inclination at which the rail 130 is set on the quadrant 131. This operation and function of the parts will be seen to be broadly the same as the operation previously described in connection with the embodiment of Figs. 1-5 inclusive, where rotation of the hand wheel 32 causes synchronous and simultaneous angular and lateral movement of the cam blank 7 (Fig. 1), and where the ratio between said angular and lateral movement is determined by the setting of the inclined rail or cam track 19 on the quadrant 28.

The angular movement of the cam blank 118 may be conveniently indicated in the following manner, reference being had more particularly to Figs. 6, 7 and 8. A worm wheel 143 is suitably journaled on a stud screw 144 in rigid threaded engagement with the carriage 110 so that the worm wheel 143 is in driven engagement with the screw shaft 121. A dial drum 145 is loosely journaled on the stud 144 and is urged toward the worm wheel 143 by means of a helical compression spring 146 whose inner end engages an anti-friction washer 147 seated against the carriage 110 and whose outer end engages a similar anti-friction washer 148 seated against the hub of drum 145. A friction washer 149, such as leather, is interposed between the drum 145 and wheel 143 providing a friction drive which causes the drum to rotate with the wheel but permits manual setting of the drum with respect to the wheel when desired. The drum 145 carries on its periphery a scale 150 which in the present embodiment is divided into fifty divisions. In the present embodiment, the wheel 143 has twenty-five teeth and the screw 121 has fifty threads active in effecting one complete rotation of the cam blank 118, so that the drum 145 will make one complete rotation for each ½ rotation of the cam blank 118. Since it is only rarely that the cam curve is to be cut for more than ½ of the angular rotation of the cam, the fifty divisions on the scale 150 will be sufficient for direct reading.

As in the case of the embodiment of Figs. 1-5, a linear scale may be employed if desirable to indicate the position of the carrier 127 longitudinally of the carriage 110, and in Fig. 13 I have indicated such a scale divided into one hundred equal sub-divisions, with each sub-division representing 1/100 angular movement of the cam blank. Such a linear scale is not necessary in addition to the circular scale 150 above described except in connection with predetermined timing wherein it might be convenient (as described in connection with the embodiment of Figs. 1-5) to cut the cam curve at a predetermined point on the cam blank. I have also indicated in Fig. 13 the division of the scale 135 of the quadrant 131 into one hundred sub-divisions, each of which represents .0010 inch depth of cut per 1/100 part of the whole angular movement of the cam blank. Also in Fig. 14 I have illustrated diagrammatically that with the rail 130 set at the main division No. 2, or twentieth subdivision, for each 1/100 angular movement or rotation of the work, there will be a depth of cut (corresponding to the cam rise) of .020 inch; and this setting will be utilized in the examples now to be described.

It is preferable to scribe the cam curve to be formed by utilizing the machine itself, and to that end a suitable scriber (not shown) is mounted on the post 107 in place of the arm 106 and motor 105, or suitable means may be provided for securing a scriber to the arm 106, so that the point may be presented to the face of the blank 118 for the operation to be more particularly pointed out hereinafter.

The cutting tool or grinding wheel 104 should be dressed or set so that the cutting portion is tangential to the cam surface to be formed (see Figs. 11 and 12).

It is within the contemplation of the invention that the surface of the cam track or rail 130 which engages the roller 137 may be curved or otherwise deviate from a straight line as shown.

OPERATION (Figs. 6–14)

Referring more particularly to Fig. 11, 118a indicates a cam blank and 104a indicates the cutting tool. The cam blank is shown as being divided into one hundred angular divisions 151 and line 152 designates the cam surface to be cut, which it is assumed will extend in an angular direction 12½ angular divisions with a total depth of cut at 153 of ¼ inch (.25 inch). By dividing the depth of cut by the number of divisions, we get .020 as the amount of lateral movement the cam blank is to be fed per angular increment of movement, which is the setting .020 which is required on the quadrant 131.

Before starting the cutting operation as shown in Fig. 11, the cam line 152 is preferably scribed on the blank by attaching a scriber as above mentioned so that its point is in the approximate plane of the face of a blank and above and in a plane passing through the axis of the blank. A blank is placed on the holder 113 (Figs. 6 and 9) and the hand wheel 124 is rotated so as to bring the division line 153 of the blank directly beneath and in register with the scriber point, the screw 141 is rotated to raise the carriage until the point comes into register with the lowermost part of the desired curve 152, or conversely the scribe point may be lowered to a like position. The hand wheel 124 is now rotated in a clockwise direction, which imparts a clockwise rotation to the blank 118a and simultaneously causes a movement of the carrier 127 and inclined rail 130 to the left, thereby laterally moving the blank 118a downwardly in the ratio predetermined by said setting of the cam track or rail 130 on the quadrant 131. The rotation of the wheel 124 is continued until the line 152 has been completely scribed.

The blank is removed and the usual run-out hole 154 may be suitably formed and the blank is then rough cut, as indicated at 155, so to leave only a small amount of stock outside of the desired cam contour 152. This rough cut may be conveniently made by a band saw or any other suitable means. The blank is then placed on the holder 113 (Figs. 6 and 9), the wheel 104a placed in position as shown, and the hand wheel 124 is rotated so as to bring the division line 153 of the blank directly beneath and in vertical register with the maximum diameter of the grinding wheel. Then with the grinding wheel placed in rotation, and by means of the screw 141, the carriage 110 is raised until the low part of the cam curve adjacent thereto has been reached; the hand wheel 124 is thereupon rotated in a clockwise direction which causes a clockwise rotation of the blank 118a and simultaneously therewith a movement of the carrier 127 and inclined rail 130 to the left, thereby laterally moving the cam blank downwardly in the ratio predetermined by said setting of the incline 130 on the quadrant 131. Fig. 12 shows the finishing cut as having progressed six angular divisions of the desired 12½ angular divisions of the cam blank 118a. In this operation, the drum scale 150 of course will rotate in the reverse direction and accordingly the scale 150 should be set so that its fixed index pointer will be opposite 12½ at the commencement of the rotation of the hand wheel 124, and the rotation of the hand wheel 124 should cease when the scale 150 reaches its zero position (corresponding to "50"). In the embodiment shown in Figs. 6-10, in the operation just referred to in connection with Fig. 12, the movement of the cam rail or track 130 to the left permits the carriage 110 to move downwardly under the force of gravity, which in the usual case will be sufficient, but if desired the carriage may of course be additionally urged in a downward direction by a spring or other auxiliary means as is well understood by those skilled in the art. The operation as referred to in connection with Fig. 12 may of course be employed if desired in connection with the embodiment of the invention illustrated in Figs. 1-5; in which case the spring 39 is relied upon for the reverse feed of the carriage when the roller 20 moves down the incline 19.

It will be noted that in both embodiments, the feed of the carriage and the resultant lateral feed of the cam blank is effected by the relative longitudinal movement between the incline and the engaging roller which results in a relative movement of the incline and roller in a transverse direction. Accordingly, it will be obvious that the incline and roller may be utilized in various ways, in order to effect the same result so long as the relative movement between these parts in one direction causes a relative movement of these parts in a transverse direction, and this movement is suitably transmitted to cause corresponding movement of the cam blank in a lateral direction to effect the depth of cut in the desired ratio to angular movement of the blank, such ratio being determined by the degree of inclination of the inclined rail or track.

If a cam rise of a relatively small amount is desired, say .020" or .025" which does not permit a rough cut by a saw, then the entire cam surface cutting operation may be done on the machine in the manner now to be described with reference to Fig. 12.

Assume that the cam rise desired as at the division line 156 is .020" and the angular extent of the cam surface is 10/100: then the cam rail will be set at .020"÷10=.002" or the second sub-division on the quadrant 131. The cam line 157 is then scribed in the manner previously pointed out and a suitable run-out hole 158 provided if desired. With the blank on the holder 113 (Figs. 6 and 9) and the cutting tool in operative position the blank is fed as follows: It is here noted that with a grinding wheel employed as a cutting tool it is desirable to limit a single cut to about .004–.005". Assuming that the cut is to be .004", then for .020" rise there would be required four cuts at the maximum depth of cut at 156, and accordingly successive angular movements A—156, B—156, C—156, D—156 and E—156. Therefore the cam blank is rotated until the division line A comes in vertical alignment with the edge of wheel 104b, then the blank raised until it just touches the wheel 104b, the hand wheel 124 is rotated in an anti-clockwise direction so as to cause the cam blank 118b (Figs. 12 and 6) to rotate in an anti-clockwise direction and simultaneously to move the rail 130 to the right to laterally feed the cam blank toward the cutting tool until the wheel reaches or just passes 156; the blank is then rotated in the reverse direction and the point B brought into engagement with the wheel, the hand wheel 124 is again rotated in an anti-clockwise direction until the cut reaches 156; and successive cuts similarly made starting at points C, D and E until the surface is finished.

From the foregoing typical examples the various uses to which the invention may be put will be understood by those skilled in the art.

Having thus described my invention with particularity with reference to present preferred embodiments of the same, and having referred to some of the possible modifications thereof, it will be obvious to those skilled in the art, after un- erstanding my invention, that other changes and modifications may be made therein without departing from the spirit and scope of my invention, and I aim in the appended claims to cover such changes and modifications as are within the scope of the invention.

What I claim is:

1. A cam producing machine, comprising in combination, a cam outlining tool, a carriage movable toward said tool, a relatively stationary abutment, a rocker fulcrumed on said carriage and arranged by engagement with said abutment to effect advance of said carriage toward said tool, a cam blank carrier journaled on said carriage to present a cam blank to said tool, a member shiftable on said carriage to actuate said rocker and common means for rotating said blank carrier and shifting said member.

2. A cam producing machine, comprising in combination, a cam outlining tool, a carriage movable toward said tool, a relatively stationary abutment, a rocker fulcrumed on said carriage and arranged by engagement with said abutment to effect advance of said carriage toward said tool, a cam blank carrier journaled on said carriage to present a cam blank to said tool, a member shiftable on said carriage to actuate said rocker and common means for rotating said blank carrier and shifting said member, including a feed screw and companion screw connections therefrom to said blank carrier and to said member.

3. A cam producing machine, comprising in combination, a cam outlining tool, a carriage movable toward said tool, a relatively stationary abutment, a rocker fulcrumed on said carriage and arranged by engagement with said abutment to effect advance of said carriage toward said tool, a cam blank carrier journaled on said carriage to present a cam blank to said tool, a member shiftable on said carriage to actuate said rocker and common means for rotating said blank carrier and shifting said member, said member including a wedging element adjustable to various inclines.

4. A cam producing machine, comprising in combination, a cam outlining tool, a carriage movable toward said tool, a relatively stationary abutment, a rocker fulcrumed on said carriage and arranged by engagement with said abutment to effect advance of said carriage toward said tool, a cam blank carrier journaled on said carriage to present a cam blank to said tool, a member shiftable on said carriage to actuate said rocker, common means for rotating said blank carrier and shifting said member, said member including a track pivoted to stand at various inclines and said rocker having a part engageable by said track.

5. A cam producing machine, comprising in combination, a cam outlining tool, a carriage movable toward said tool, a relatively stationary abutment, a rocker fulcrumed on said carriage and arranged by engagement with said abutment to effect advance of said carriage toward said tool, a cam blank carrier journaled on said carriage to present a cam blank to said tool, a member shiftable on said carriage to actuate said rocker, common means for rotating said blank carrier and shifting said member and means for holding the carriage with said rocker engaged with said abutment.

6. A cam producing machine, comprising in combination, a cam outlining tool, a carriage movable toward said tool, a relatively stationary abutment, a rocker fulcrumed on said carriage and arranged by engagement with said abutment to effect advance of said carriage toward said tool, a cam blank carrier journaled on said carriage to present a cam blank to said tool, a member shiftable on said carriage to actuate said rocker, common means for rotating said blank carrier and shifting said member and means adjustably mounting said relatively stationary abutment for movement away from said rocker.

7. A cam producing machine, comprising in combination, a cam outlining tool, a carriage movable toward said tool, a relatively stationary abutment, a rocker fulcrumed on said carriage and arranged by engagement with said abutment to effect advance of said carriage toward said tool, a cam blank carrier journaled on said carriage to present a cam blank to said tool, a member shiftable on said carriage to actuate said rocker, common means for rotating said blank carrier and shifting said member, said rocker including a rock shaft and angularly related lever arms projecting therefrom, one into engagement with said abutment and the other in position for engagement by said shiftable member.

8. A cam producing machine, comprising in combination, a cam outlining tool, a carriage movable toward said tool, a relatively stationary abutment, a rocker fulcrumed on said carriage and arranged by engagement with said abutment to effect advance of said carriage toward said tool, a cam blank carrier journaled on said carriage to present a cam blank to said tool, a member shiftable on said carriage to actuate said rocker, common means for rotating said blank carrier and shifting said member, said rocker including pivotally supported angularly related rock arms, one engageable with said relatively stationary abutment and the other engageable by said shiftable member.

9. A cam producing machine, comprising in combination, a cam outlining tool, a carriage movable toward said tool, a relatively stationary abutment, a rocker fulcrumed on said carriage and arranged by engagement with said abutment to effect advance of said carriage toward said tool, a cam blank carrier journaled on said carriage to present a cam blank to said tool, a member shiftable on said carriage to actuate said rocker, common means for rotating said blank carrier and shifting said member, said member including an adjustable slide and a cam track on said slide adjustable to various inclines in respect to said rocker.

10. A cam producing machine, comprising in combination, a cam outlining tool, a carriage movable toward said tool, a relatively stationary abutment, a rocker fulcrumed on said carriage and arranged by engagement with said abutment to effect advance of said carriage toward said tool, a cam blank carrier journaled on said carriage to present a cam blank to said tool, a member shiftable on said carriage to actuate said rocker, common means for rotating said blank carrier and shifting said member, said member including a cam track engageable with said rocker and means for effecting the positioning of said cam track in variously inclined relations to said rocker.

11. A cam producing machine, comprising in combination, a cam outlining tool, a slide carriage movable toward and away from said tool, a shaft journaled on said carriage, rock levers projecting from said shaft, a relatively stationary abutment positioned for engagement by one of said rock levers, a slide adjustable on said carriage, a cam track adjustable to various inclines on said slide and engageable by one of said rock levers, a cam blank carrier journaled on said carriage and a feed screw operable to rotate said cam blank carrier and to shift said slide.

12. A cam producing machine, comprising a carriage, a cam blank carrier rotatably mounted on said carriage, a carrier mounted for longitudinal travel on said carriage, means for longitudinally advancing said last mentioned carrier and for rotating said cam blank carrier, scale means for indicating the longitudinal advance of said longitudinally movable carrier, a cam track on said longitudinally movable carrier and adjustable to various inclines, scale means associated with said angularly adjustable cam track, an abutment relatively stationary in respect to said carriage and a rocker journaled on the carriage and having one arm engageable by said cam track and another arm engageable with said abutment.

13. A cam producing machine, comprising a carriage, a cam blank carrier rotatably mounted on said carriage, a carrier mounted for longitudinal travel on said carriage, means for longitudinally advancing said last mentioned carrier and for rotating said cam blank carrier, a cam track on said longitudinally movable carrier and adjustable to various inclines, and means for feeding said carriage including a part movable along said cam track incline, whereby upon longitudinal advance of said carrier said carriage is fed forward by longitudinal movement of said cam track incline and said cam blank carrier is rotated.

14. A cam producing machine, comprising a carriage, a cam blank carrier rotatably mounted on said carriage, a carrier mounted for longitudinal travel on said carriage, means for longitudinally advancing said last mentioned carrier and for simultaneously and synchronously rotating said cam blank carrier, scale means for indicating the rotational movement of said blank carrier, a cam track on said longitudinally movable carrier and adjustable to various inclines, scale means associated with said angularly adjustable cam track, and means for feeding said carriage including a part movable along said cam track incline, whereby upon longitudinal advance of said carrier said carriage is fed forward by longitudinal movement of said cam track and said cam blank carrier is simultaneously rotated in synchronism therewith.

15. A cam forming machine comprising a cam outlining tool, a carriage mounted for movement toward said tool, a cam blank holder rotatably journaled on said carriage, whereby a cam blank carried on said holder is circumferentially and laterally movable relative to said tool, means for rotating said blank holder to effect said circumferential movement, mechanism for moving said carriage toward said tool comprising an inclined first member and a second member engaging said first member, one of said members being mounted on said carriage for horizontal movement relative to the other member, one of said members being movable in a vertical direction relative to the other of said members and being secured to said carriage for imparting feeding movement thereto upon relative movement of said engaging member along said incline.

16. A cam forming machine comprising a cam outlining tool, a carriage mounted for movement toward said tool, a cam blank holder rotatably journaled on said carriage, whereby a cam blank carried on said holder is circumferentially and laterally movable relative to said tool, means for rotating said blank holder to effect said circumferential movement, an inclined track and a track follower mounted for relative movement in a first direction along said track, means for effecting said first directional movement simultaneously and synchronously with said rotational movement of said blank holder, said track and follower being relatively movable in a direction transverse to said first directional movement to provide a feeding force, means for translating said feeding force into movement of said carriage to thereby feed said holder laterally, said incline serving to determine the ratio between rotational and lateral movement of said cam blank, and means for adjusting the inclination of said track to vary said ratio.

17. A cam forming machine comprising a cam outlining tool, a carriage mounted for movement toward said tool, a cam blank holder rotatably journaled on said carriage, whereby a cam blank carried on said holder is circumferentially and laterally movable relative to said tool, means for rotating said blank holder to effect said circumferential movement, an inclined track and a track follower mounted for relative movement in a first direction along said track, means for effecting said first directional movement simultaneously and synchronously with said rotational movement of said blank holder, said track and follower being relatively movable in a direction transverse to said first directional movement to provide a feeding force, and means for translating said feeding force into movement of said carriage to thereby feed said holder laterally.

18. A cam producing machine, comprising a carriage, a cam blank carrier rotatably mounted on said carriage, a carrier mounted for longitudinal travel on said carriage, means for longitudinally advancing said last mentioned carrier and for rotating said cam blank carrier, scale means for indicating the longitudinal advance of said longitudinally movable carrier, a cam track member on said longitudinally movable carrier and adjustable to various inclines, scale means associated with said angularly adjustable cam track member, and a cam track engaging member, one of said members being anchored to a relatively stationary part in respect to said carriage, and the other of said members being secured to said carriage for movement therewith in one direction of movement, whereby upon longitudinal advance of said carrier said carriage is fed forward by relative longitudinal movement between said cam track and its engaging member.

19. A cam producing machine, comprising a carriage, a cam blank carrier rotatably mounted on said carriage, a carrier mounted for longitudinal travel on said carriage, means for longitudinally advancing said last mentioned carrier and for rotating said cam blank carrier, scale means for indicating the longitudinal advance of said longitudinally movable carrier, a cam track on said longitudinally movable carrier and adjustable to various inclines, scale means associated with said angularly adjustable cam track, and a relatively fixed roller along which said incline is movable, whereby upon longitudinal advance of said carrier said carriage is fed forward by relative longitudinal movement between said cam track and said fixed roller.

20. A machine of the character described, comprising a relatively fixed standard, a cam cutting member rotatably mounted on said standard, a carriage mounted on said standard for vertical movement relative thereto, a cam blank carrier journaled on said carriage to present a cam to said tool, an incline member mounted on said carriage for horizontal movement relative to said carriage and movable with said carriage in a vertical direction relative to said standard, a relatively fixed abutment carried on said standard in the path of movement of said incline member when the latter is moved in the horizontal direction, whereby horizontal movement of said incline member relative to said fixed member produces vertical movement of said carriage and cam blank holder, means for simultaneously rotating said blank carrier holder and moving said incline member horizontally relative to said carriage, whereby the cam blank carried on said holder is angularly and laterally movable with respect to said cutting tool.

GEORGE ANTOS.